UNITED STATES PATENT OFFICE.

JOHN A. ROBERTSON, OF OAKLAND, CALIFORNIA.

IMPROVEMENT IN EXTRACTING PRECIOUS METALS FROM ORES.

Specification forming part of Letters Patent No. 214,055, dated April 8, 1879; application filed February 8, 1879.

*To all whom it may concern:*

Be it known that I, JOHN A. ROBERTSON, of Oakland, in the county of Alameda and State of California, have invented certain new and useful Improvements in the Process of Extracting Precious Metals from Ores, of which the following is a description.

The object of my invention is to perform in a single operation what has required two or three operations and much time to effect in the process of extracting precious metals from rebellious ores—that is to say, by thoroughly desulphurizing the ore and bringing the precious metal to a condition to amalgamate freely, aggregating the same, and freeing it entirely from the influence and union with the base metals.

To effect this object I place a vat or receiver of sufficient capacity to hold the ore of the most convenient quantity for a single operation—say one ton—and immerse the same in a quantity of water sufficient to cover it. The required quantity of salt to make a thick brine, or as much as can be held in solution with the same, is then used, adding thereto about one-half pound of cyanide of potassium and one-half pound of sulphate of copper, forming a solution of salt and cyanide of potassium in the above-described manner. The ton or other desired quantity of ore is slowly heated to a red heat, and afterward plunged, while red-hot, into the aforesaid solution, the ore being broken up to about the same size that it is broken for milling. By bringing the ore in contact with the solution it becomes thoroughly desulphurized.

The entire operation of desulphurizing and disintegrating the quartz and sulphurets is almost instantaneous.

Iron pyrites and sulphurets generally are reduced to a very fine flour or almost impalpable powder, and the quartz is disintegrated, that it may be readily picked to pieces with the hands, and requires so little rubbing that it may be readily prepared for amalgamation in an ordinary amalgamating-pan.

The action of the cyanide of potassium, in connection with the sulphate of copper, cleans, brightens, and immediately prepares the precious metals for amalgamation with the quicksilver, no matter how fine and impalpable the same may be.

The solution composed of the above ingredients and the manner of treating the ore previous to its being brought in contact with the same render the operation of extracting the precious metals from the ore very simple and effectual, and accomplish it in a very short time.

Having now fully described my invention, what I claim as new, and desire to secure by Letters Patent, is—

The process of separating precious metals from the ore by heating the ore to a red heat, and afterward plunging it in a solution of salt, sulphate of copper, and cyanide of potassium, in about the proportions set forth.

JOHN A. ROBERTSON.

Witnesses:
 JOHN H. REDSTONE,
 ALBERT E. REDSTONE.